United States Patent
Petkov et al.

(10) Patent No.: US 10,972,147 B2
(45) Date of Patent: Apr. 6, 2021

(54) METHOD FOR SELECTING FREQUENCY CHANNELS

(71) Applicant: DIEHL METERING SYSTEMS GMBH, Nuremberg (DE)

(72) Inventors: Hristo Petkov, Nuremberg (DE); Thomas Kauppert, Nuremberg (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 16/804,754

(22) Filed: Feb. 28, 2020

(65) Prior Publication Data
US 2020/0204207 A1   Jun. 25, 2020

Related U.S. Application Data

(63) Continuation of application No. 16/287,258, filed on Feb. 27, 2019, now Pat. No. 10,715,211, which is a (Continued)

(30) Foreign Application Priority Data

Aug. 27, 2016 (DE) .......................... 10 2016 010 432

(51) Int. Cl.
*H04B 1/715* (2011.01)
*H04L 1/00* (2006.01)
(Continued)

(52) U.S. Cl.
CPC ............. *H04B 1/715* (2013.01); *H04B 1/713* (2013.01); *H04B 1/7143* (2013.01);
(Continued)

(58) Field of Classification Search
CPC .... H04B 1/715; H04B 17/318; H04B 17/345; H04B 1/716; H04B 1/7143;
(Continued)

(56) References Cited

U.S. PATENT DOCUMENTS

| | | | |
|---|---|---|---|
| 3,958,456 A | | 5/1976 | Jacobson |
| 5,454,010 A | * | 9/1995 | Leveque .................. H04B 1/64 375/136 |

(Continued)

FOREIGN PATENT DOCUMENTS

| | | |
|---|---|---|
| DE | 10320176 B3 | 12/2004 |
| DE | 102013008253 A1 | 3/2014 |
| EP | 2642706 A1 | 9/2013 |

OTHER PUBLICATIONS

Hanzo L et al, "Burst-by-burst adaptive wideband wireless video telephony", Communications and Vehicular Technology, 2000. SCVT-200. Symposium on Oct 19, 2000, Piscataway, NJ, USA,IEEE, (Jan. 1, 2000), ISBN 978-0-7803-6684-8, pp. 215-232, XP010542756.

(Continued)

*Primary Examiner* — Jaison Joseph
(74) *Attorney, Agent, or Firm* — Laurence A. Greenberg; Werner H. Sterner; Ralph E. Locher

(57) ABSTRACT

A method selects frequency channels in a communication system using a frequency hopping method, in which data are transmitted between a transmitter and a receiver. The data are transmitted as data packets having a plurality of bits in a frequency/time block. A respective data packet is coded before transmission by the transmitter and is decoded after reception by the receiver. The transmission quality of the frequency channels is evaluated and, a decision is made for a selection of the frequency channel which is used for the transmission of the data. A likelihood ratio for the likelihood of a successful transmission is determined before the decoding by the receiver, the likelihood ratio is used as a metric for determining the interference state of the respective data packet, and the transmission quality of the respective frequency channel is evaluated on the basis of the interference state of the data packet.

10 Claims, 11 Drawing Sheets

Related U.S. Application Data continuation of application No. PCT/EP2017/000983, filed on Aug. 16, 2017.

(51) Int. Cl.

| | |
|---|---|
| *H04B 1/7143* | (2011.01) |
| *H04L 1/20* | (2006.01) |
| *H04B 1/713* | (2011.01) |
| *H04B 17/318* | (2015.01) |
| *H04B 17/345* | (2015.01) |
| *H04L 25/03* | (2006.01) |
| *H04W 72/04* | (2009.01) |
| *H04W 72/08* | (2009.01) |

(52) U.S. Cl.
CPC ......... *H04B 17/318* (2015.01); *H04B 17/345* (2015.01); *H04L 1/0001* (2013.01); *H04L 1/004* (2013.01); *H04L 1/20* (2013.01); *H04L 25/03171* (2013.01); *H04W 72/0453* (2013.01); *H04W 72/082* (2013.01); *H04W 72/085* (2013.01); *H04B 2001/7154* (2013.01)

(58) Field of Classification Search
CPC . H04L 25/03171; H04L 1/0001; H04L 1/004; H04L 1/20; H04W 72/0453; H04W 72/082; H24W 72/085
See application file for complete search history.

(56) References Cited

U.S. PATENT DOCUMENTS

| | | | |
|---|---|---|---|
| 7,529,288 | B2 | 5/2009 | Felbecker et al. |
| 9,197,365 | B2 | 11/2015 | Felix et al. |
| 2002/0136268 | A1 | 9/2002 | Gan et al. |
| 2006/0013172 | A1* | 1/2006 | Ruuska ................ H04B 1/7143 370/338 |
| 2006/0025136 | A1 | 2/2006 | Fujita ................ H04W 74/0816 455/436 |
| 2006/0133543 | A1 | 6/2006 | Linsky et al. |
| 2009/0067370 | A1* | 3/2009 | Kim .................... H04L 27/2613 370/328 |
| 2012/0281791 | A1* | 11/2012 | Tsuchida ............. H04L 27/2663 375/343 |
| 2013/0308685 | A1* | 11/2013 | Nagai ................... H04W 72/02 375/133 |
| 2016/0329929 | A1* | 11/2016 | Kenney ................ H04L 5/0012 |
| 2020/0007187 | A1* | 1/2020 | Seller .................. H04B 1/7156 |
| 2020/0177233 | A1* | 6/2020 | Kneissl ................ H04B 1/7136 |
| 2020/0196272 | A1* | 6/2020 | Xiong ....................... H04L 1/18 |

OTHER PUBLICATIONS

Rao, S. (Implementing a Bidirectional Frequency Hopping Application With TRF6903 and MSP430.Dallas, TX: Texas Instruments Sep. 2004). (Year: 2004).

\* cited by examiner

METHOD FOR SELECTING FREQUENCY CHANNELS

CROSS-REFERENCE TO RELATED APPLICATION

This application is a continuation of patent application Ser. No. 16/287,258, filed Feb. 27, 2019; which was a § 371 national stage filing of international application No. PCT/EP2017/000983, filed Aug. 16, 2017, which designated the United States; the prior applications are herewith incorporated by reference in their entirety.

BACKGROUND OF THE INVENTION

Field of the Invention

The present invention relates to a method for selecting frequency channels in a communication system using a frequency hopping method.

Communication systems in which data are transmitted by a radio link are used today in many areas. For example, in the field of intelligent consumption metering devices, known as smart meters. This concerns consumption metering devices located in a supply network, e.g. for energy, power, gas, water or the like, which indicate the actual consumption to the respective connection user and are incorporated into a generic communication system in order to transmit e.g. the recorded consumption data to the provider. Intelligent consumption metering devices offer the advantage that manual meter readings are no longer required and shorter-term billing can be implemented by the provider according to actual consumption. Shorter-term reading intervals in turn enable a more accurate linkage between end customer tariffs and the development of trading prices for electricity. Supply networks can also be substantially more effectively utilized.

Intelligent consumption metering devices are normally assigned in each case to residential units or residential buildings. The consumption data generated there can be transmitted, for example, in the form of data packets or parts of data packets (known as hops) via a radio link, e.g. in the ISM (Industrial, Scientific, Medical) or SRD (Short Range Device) band frequency range. These frequency ranges offer the advantage that operators require only a general license for frequency management. However, the problem exists that interference can often occur due to the frequency of use of frequency ranges of this type for a wide range of technical devices, such as, for example, garage door controls, alarm systems, WLAN, Bluetooth, smoke detectors, etc. Consumption data are normally collected via a radio link either by stationary or mobile receivers, referred to as data collectors or data concentrators, to which the consumption data provided by the consumption metering devices are transmitted. The data collectors can then forward the data to a higher-level central unit, such as e.g. the central control room of the provider.

Data packets can be transmitted in a communication system on a plurality of frequencies or frequency channels within a frequency range (frequency hopping method) in order to improve the transmission quality of the data packets. The facility exists here to select frequency channels in a targeted manner, i.e. to eliminate interference-affected frequency channels and transmit via frequency channels unaffected or less affected by interference. A frequency channel changeover is performed according to the frequency hopping method if the data transmission on one frequency channel is affected by interference.

A changeover to other frequency channels is preferably performed automatically using the adaptive frequency hopping method. The adaptive frequency hopping method enables a rapid response to frequency channels affected by interference. Furthermore, in the case of a frequency channel changeover from a frequency channel affected by interference to a new frequency channel unaffected by interference, the new frequency channel is defined by pseudorandom numbers. However, due to this random selection of the new frequency channel, it may occur that a frequency channel is selected which is similarly affected by interference or whose transmission quality is even worse than that of the original frequency channel.

A method for selecting frequency channels of a data transmission system is known from German patent DE 103 20 176 B3, corresponding to U.S. Pat. Nos. 8,537,877 and 7,529,288. In the method, the transmission qualities of the frequency channels are determined during the transmission of a data packet between a transmitter and a receiver by measuring the data packet error rate and/or the bit error rate, and also the field strength of the received signal. The determined field strength is compared with a definable threshold value field strength for the selection decision in respect of the frequency channels. The data packet error rate and/or the bit error rate and also the field strength of the received signal are measured here within defined transmit timeslots of the measuring unit (transmitter or receiver) in which only one transmitter in each case transmits data packets. The method is complex and susceptible to interference, given that that the transmit timeslots have to be coordinated for all transmitters and receivers.

A method for operating a communication network is known from U.S. patent publication No. 2002/0136268 A1. The communication network uses a frequency hopping method in which the performance of a communication channel or frequency channel is evaluated using different methods in order to make a selection of the communication channel. For example, a specific test packet with known content is transmitted via the communication channel, a received signal strength indicator (RSSI) is determined, a preamble correlation is carried out on the basis of a preamble at the beginning of the data packet, a packet loss ratio (PLR) is determined or a specific check is carried out, e.g. a header error check (HEC), a cyclic redundancy check (CRC) or a forward error correction (FEC) in order to test the performance of the communication channel.

U.S. patent publication No. 2006/0133543 A1 discloses a wireless communication system using a frequency hopping method in which the frequency channels are evaluated and selected on the basis of the received signal strength indicator (RSSI) or a packet error ratio (PER).

An apparatus for communicating via a radio communication channel is furthermore known from U.S. patent publication No. 2006/0013172 A1, the apparatus using a frequency hopping method and carrying out a frequency channel measurement and frequency channel selection here on the basis of the received signal strength indicator (RSSI) of a data packet received on the frequency channel.

A method for decoding a coded data packet is known from published, non-prosecuted German patent application DE 10 2013 008 253 A1, corresponding to U.S. Pat. No. 9,197,365. The data packets are decoded here in such a way that they contain error detection bits (cyclic redundancy check (CRC) bits) and/or error correction bits (forward error correction (FEC) bits). The receiver comprises a receiver module for receiving the coded data packets, a decoder for decoding the data packets, and an LLR module for defining LLR values, known as log likelihood ratios, for coded data bits of the data packet. Here, the LLR value indicates the likelihood of the respective coded data bit being affected or unaffected by interference. A preselection determining whether or not the decoder decodes the data bits can finally be made on the basis of these LLR values. The decoder can then detect and correct the non-decoded data bits during the decoding on the basis of the error detection bits and error correction bits.

SUMMARY OF THE INVENTION

On the basis of the prior art, the object of the present invention is to provide a method for selecting frequency channels with which an improved transmission quality and transmission reliability are enabled.

The aforementioned object is achieved by the overall teaching of the independent claim and of the subordinate claims. Appropriate designs of the invention are claimed in the subclaims.

According to the invention, a likelihood ratio (LR) is determined for the likelihood of a successful transmission before the decoding by the receiver. To do this, the receiver may, for example, have an LLR module to determine the LLR value of the data packet. The likelihood ratio LR is used here as a metric for determining the interference state of the data packet, i.e. the likelihood ratio LR of the data packet serves e.g. as a numerical measure for determining the interference state of the data packet. In a practical manner, the transmission quality of the respective frequency channel can thus be evaluated on the basis of the determined interference state of the data packet or the LLR values. The selection of the frequency channels can thereby be improved in terms of their transmission quality to a particular extent, as a result of which the transmission quality and transmission reliability of the communication system can be substantially increased.

The likelihood ratio LR can be determined on a bit-by-bit basis, or for a defined number of bits of the data packet or of a part of the data packet. The LLR module can, for example, determine an LLR value for each transmitted bit. The likelihood ratios LR of the bits determined in this way or the defined number of bits can then be used as a metric for determining the interference state of the respective data packet or of the respective part of the data packet.

The signal power SL1 is appropriately determined in a frequency/time block outside the transmission of the respective data packet, i.e. the signal noise outside the transmission of the data packet, in the frequency channel concerned. The signal power SL1 which is determined in a frequency/time block outside the transmission of the respective data packet can be defined, for example, by an external signal (interference signal) and/or by fading and/or by the background noise. The signal power SL2 of the transmitting communication module can furthermore also be determined in a frequency/time block within the transmission of the respective data packet in the frequency channel concerned. Since the signal power SL1 is determined outside the transmission of the data packet, it can be defined whether a source of interference, i.e., for example, an external signal transmission, is or is not present on the frequency channel concerned. Here, a high signal noise on the frequency channel also indicates a frequency channel affected by interference. Conversely, a low signal noise on the frequency channel normally indicates a frequency channel unaffected by interference. This offers the resulting advantage that, due to the detection of the signal power SL1 on a frequency channel, the transmitter and/or receiver has the facility to additionally check whether a successful transmission of the data packets is or is not likely on this frequency channel. The data collector can, for example, identify interference affecting the frequency channels and can then transmit the information to the consumption metering device indicating whether the frequency channel concerned is or is not affected by interference.

The signal power SL1 outside the data packet and the signal power SL2 during the transmission of the data packet are preferably placed in relation to one another in order to define e.g. a signal-to-noise-ratio or a signal-to-interference-ratio. The interfering influence of the signal noise on the transmission of the data packet can be determined, for example, on the basis of the signal-to-noise ratio and the transmission quality on the frequency channel concerned can thus be defined. Furthermore, it can thereby be determined whether the frequency channel has a low signal noise due to transmission problems or fading or whether noise signals have occurred.

The signal powers SL1 and/or SL2 and/or the relation between the signal powers SL1 and SL2 can be used to fine-tune the likelihood ratio LR. The LLR value can be scaled, for example, with the determined relation between the signal powers SL1 and SL2 in order to incorporate e.g. the signal-to-noise ratio and/or the signal-to-interference ratio on the respective frequency channel also into the evaluation of the transmission quality of the respective frequency channel. The frequency channel selection is thereby improved to a substantial extent.

A mean value of the likelihood ratio LR of the bits or of a defined number of bits of a data packet preferably serves as a metric for determining the interference state of the respective data packet. A statement on the interference state of the data packet can thus be made in a simple manner.

The interference state of the data packet or parts thereof can be indicated here as a percentage value, as a decimal indication or as a dual expression, e.g. as a binary numerical expression "0" or "1", or as a decision expression "yes" or "no".

A threshold value TV can appropriately be defined as a selection criterion or quality feature for the interference state of the data packet, wherein the transmission quality of the respective frequency channel is evaluated on the basis of the threshold value TV. A data packet containing 12 bits, in which 3 bits have been rated as good (bit 1) and 9 bits have been down rated (bit 0) can be rated with the expression 25% bit 1/75% bit 0, so that the interference state of the data packet lies at 25%. With a threshold value TV=50%, the interference state of the data packet can thus be indicated as "no", "affected by interference" or "0". Consequently, the evaluation of the transmission quality of the frequency channel would also be indicated on the basis of this data packet e.g. as "no", "affected by interference" or "0". A plurality of interference states of data packets which have been transmitted via one frequency channel could furthermore also be used as a basis for evaluating the transmission quality of this frequency channel. This can be done in a simple manner by averaging the interference states of the data packets.

A plurality of frequency channel patterns comprising a respectively defined sequence of occupancy of the frequency channels is preferably provided. A frequency channel pattern can either extend here over all frequency channels, i.e. every frequency channel is used for the transmission of the data packets (full diversity), or it can be provided to eliminate specific frequency channels. A center-weighted frequency channel pattern, for example, can eliminate all peripheral frequency channels (high and low frequency ranges) for the transmission of the data packets. Alternatively, all peripheral frequency channels can also be used in a frequency channel pattern for the transmission of the data packets. Furthermore, only the frequency ranges of one side, i.e. either the high or the low frequency ranges, can also be used for the transmission of the data packets. For the transmission of a message consisting of a plurality of data packets, the data packets can always be transmitted in a specific frequency channel sequence, e.g. data packet 1 via frequency channel 1, data packet 2 via frequency channel 2, data packet 3 via frequency channel 4, data packet 4 via frequency channel 3, data packet 5 via frequency channel 1, etc. The frequency channel pattern can be repeated here as often as required.

A change from the current frequency channel pattern to a different frequency channel pattern can appropriately be performed on the basis of the evaluation of the transmission quality of the respective frequency channel.

An algorithm can furthermore be provided with which the transmitter chooses a frequency channel pattern which is communicated to the receiver before or with the transmission of the data. The algorithm may, for example, be a random value or an event-based calculation.

The frequency channel pattern is preferably changed only if the transmission quality of the new frequency channel pattern has been verified. The verification can be performed e.g. by means of a frequency channel sampling or a calibration function. This offers the resulting advantage that no frequency channels or frequency channel patterns are selected which have a poor transmission quality.

A change signal can appropriately be generated by the transmitter in order to signal an imminent change of the frequency channel pattern. The change signal must be acknowledged here by the receiver by means of an acknowledgement signal to the transmitter in order to enable a change of the frequency channel or of the frequency channel pattern. The acknowledgement signal is generated by the receiver and is transmitted to the transmitter in order to permit a change of the frequency channel pattern. The communication between the transmitter and receiver is performed here bi-directionally. This offers the resulting advantage that no change of the frequency channel pattern takes place between the transmitter and receiver without agreement on the new frequency channel pattern. As a result, the transmission situation or the evaluation of the frequency channel is also taken into account by the transmitter and receiver for the selection of the frequency channel pattern. The transmission reliability in the selection of the frequency channels is thereby increased to a substantial extent. It is appropriate here if the change signal of the transmitter already contains a frequency channel pattern proposed by the transmitter.

Alternatively or additionally, the acknowledgement signal can also contain a frequency channel pattern proposed by the receiver or is transmitted in the proposed frequency channel pattern, wherein the frequency channel pattern thereby proposed by the receiver is then verified by the transmitter and is rejected or accepted by the transmitter on the basis of the verification.

The frequency channels can advantageously be sampled by transmitting a first part of the data packets and/or a first part of the bits of a data packet via specific frequency channels without a frequency channel change. A second part of the data packets and/or a second part of the bits of a data packet are furthermore moved to other frequency channels not used for the data packet transmission in order to determine the transmission quality of these frequency channels.

The transmission quality of the frequency channels on which the second part of the data packets is transmitted can thereby be evaluated. Spectral gaps can furthermore be identified through this step-by-step evaluation of the frequency channels or frequency channel sampling (calibration function), and the transmission quality of the entire frequency band can thus be assessed. The evaluation of these frequency channels can also be incorporated into the selection of the frequency channels or frequency channel patterns. This offers the resulting advantage that a broad range of frequency channels can be assessed for the frequency channel selection. All frequency channels of a frequency band are preferably sampled in the sampling of the frequency channels in order to determine the optimum transmission quality within the frequency band.

The transmission quality of one frequency channel can also be evaluated in a particularly advantageous manner on the basis of the evaluated transmission quality of other frequency channels or the interference state of a data packet which has been transmitted via a different frequency channel. This evaluation can be performed through interpolation, whereby e.g. the already performed evaluation of adjacent frequency channels of a non-evaluated frequency channel provides an indication of how good the transmission quality of a non-evaluated frequency channel between the is, e.g. by averaging the interference state of the data packets which have been transmitted on the adjacent frequency channels. Frequency channels can thereby be evaluated without data packets or data packet parts having been transmitted via these frequency channels, so that the number of evaluated frequency channels is increased with unvarying evaluation effort. The time required for the evaluation of the frequency channels can furthermore be reduced as a result.

The transmitter and/or the receiver preferably comprise(s) a frequency reference device for defining the frequency, wherein the frequency reference devices normally have frequency deviations and the frequency deviations are used to select and/or correct the frequency channel(s) and/or the frequency channel pattern.

Secondarily, the present invention claims a method which includes the following method steps:
a) transmitting a data packet via a frequency channel from the transmitter to the receiver;
b) receiving of the data packet by the receiver;
c) determining by the receiver, preferably bit-by-bit or group-by-group for specific bits, of the likelihood ratios LR of the data packet or for a defined part of the data packet;
d) estimating by the receiver of the frequency deviation of the frequency reference device of the transmitter;
e) determining the interference state of the data packet on the basis of the likelihood ratios LR;
f) evaluating the transmission quality of the respective frequency channel on the basis of the interference state of the data packet;
g) selecting and/or correcting a frequency channel or a frequency channel pattern on the basis of the evaluation result; and
h) communicating the chosen frequency channel and/or the chosen frequency channel pattern from the receiver to the transmitter.

A memory can appropriately be provided to store the evaluations of the transmission quality of a frequency channel. The frequency channels and/or the frequency channel pattern is/are additionally selected on the basis of the stored evaluations.

It is particularly appropriate if a quality indicator QI which is used for the evaluations of the respective frequency channel pattern is determined on the basis of the evaluation of the frequency channels and/or the interference state of the data packet or of a part of the data packet, and the frequency channel pattern is selected on the basis of the quality indicator QI.

According to one particular design variant of the method, the transmitter and/or the receiver may be a consumption metering device to record the consumption data or a data collector to collect the consumption data. The communication system serves here to transmit the consumption data from a plurality of consumption metering devices to one or more data collectors. The data collector(s) can then transmit these consumption data to a higher-level central unit of the provider. Furthermore, operational data, such as e.g. firmware updates, can also be distributed via the communication system to the consumption metering devices.

The calibration function is preferably performed using the downlink method, i.e. the data collector transmits the data packets to the consumption metering device for the evaluation of frequency channels. The transmit frequency and the receive frequency are used here only for the transmission between these two transmitter and receiver communication modules. Alternatively, however, the calibration function can also be performed using the uplink method, in which e.g. the respective consumption metering devices transmit data packets to the data collector. For this purpose, the data collector must record the transmission of all consumption metering devices on one frequency channel. In particular, it is correspondingly advantageous for the uplink method to define specific times, referred to as timeslots, for the transmission of the data packets from the consumption metering devices to the data collector on specific frequency channels in order to implement a time division of the transmission of the data packets. Interference which could occur due to the simultaneous transmission of a plurality of consumption metering devices can thereby be avoided.

In an alternative design variant of the method, the transmitter is an apparatus for determining a content level. An apparatus of this type could be provided, for example, on a garbage bin to determine the content level of the garbage bin, a water reservoir to determine the water level (e.g. drinking water reservoir, drainage system or storm overflow), a shelf (e.g. to store goods in daily use, documents or medicines) to determine the storage quantities, or a different storage container (e.g. a refrigerator or the like) to determine the content level of the items stored in the storage container.

Secondarily, the present invention claims a method in which the frequency channel(s) and/or the frequency channel pattern is/are selected on the basis of a random value. The random value can be defined here e.g. randomly, pseudo-randomly or by a definable algorithm. The transmitter "rolls the dice", for example, to obtain the random value by means of a specific encryption mechanism, thereby generating a random frequency channel pattern on the basis of randomly chosen frequency channels, in particular from the already positively evaluated frequency channels. The random value is transmitted in each case to the receiver before the data transmission so that the receiver can determine or calculate the selection of the frequency channels or frequency channel pattern by the transmitter on the basis of the random value.

The selection can appropriately be made once more on the basis of the random value with each subsequent data transmission or at specific time intervals. As a result, new frequencies or frequency channel patterns are always selected, so that the transmission quality is improved to a particular extent. Furthermore, it has surprisingly become evident that transmission reliability is improved since e.g. attacks on the communication system by third parties are substantially hindered as a result of the random and frequently performed variation of the frequency channels or the frequency channel pattern.

Other features which are considered as characteristic for the invention are set forth in the appended claims.

Although the invention is illustrated and described herein as embodied in a method for selecting frequency channels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
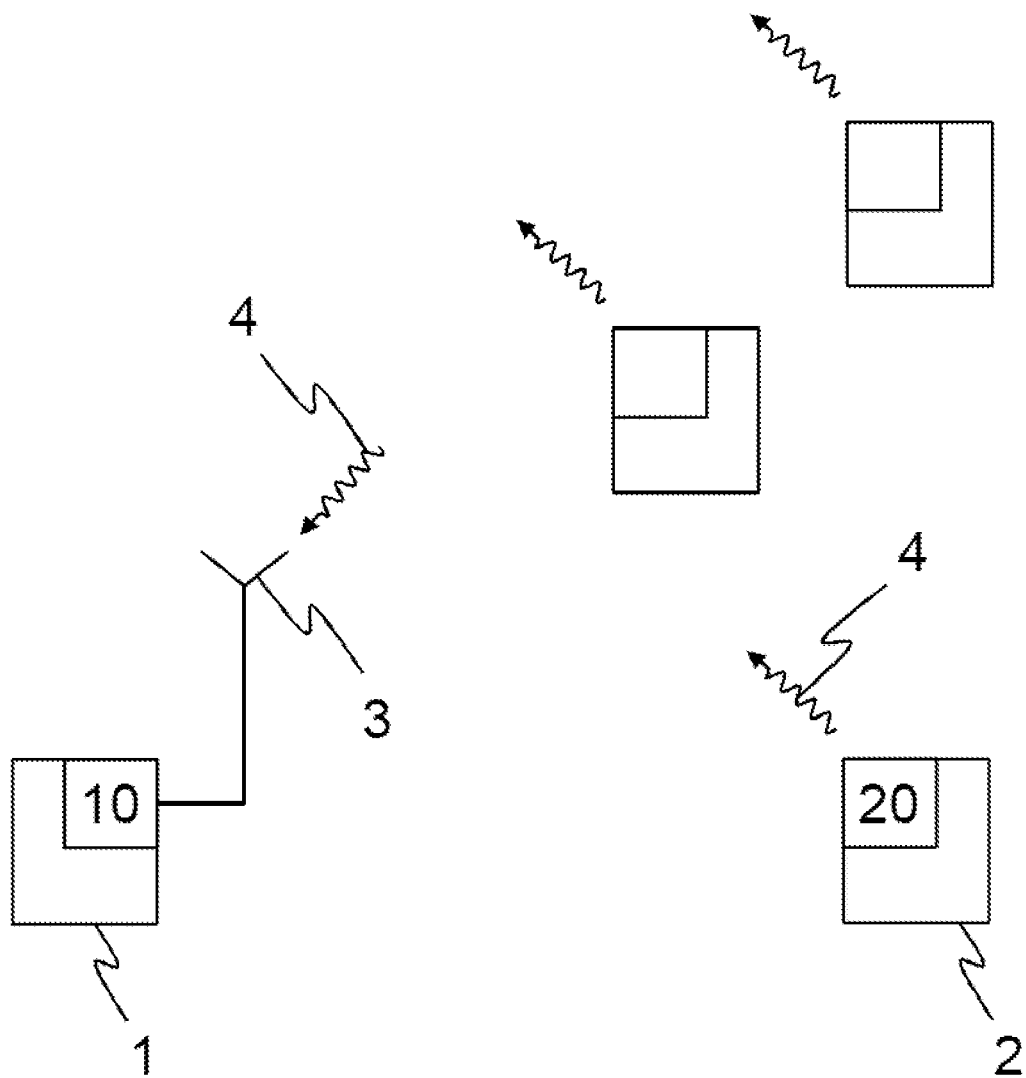
FIG. 1 is a simplified schematic view of a plurality of consumption metering devices which in each case transmit data packets to a data collector by a communication module.

Referring now to the figures of the drawings in detail and first, particularly to FIG. 1 thereof, there is shown a communication system in which a plurality of consumption metering devices 2 in each case with an integrated communication module 20 communicate via a radio link with a communication module 10 of a data collector 1. Here, the respective consumption metering device 2 transmits data packets 4 or parts of the data packets 4 via the communication module 20 to the communication module 10 of the data collector 1. In order to guarantee an adequate reception of the data packets 4, the communication module 10 of the data collector 1 contains an antenna 3. The data packets 4 contain, for example, the consumption metering data of the respective consumption metering device 2, such as, for example, the meter reading, present consumption, temperature or the like. The data packets 4 are transmitted here between the communication modules 10 and 20 via a radio link using the frequency hopping method. Depending on whether the respective consumption metering device 2 and/or the data collector 1 is currently transmitting or receiving, the consumption metering device 2 and/or the data collector 1 can be the transmitter or the receiver.

The data packets 4 are transmitted according to the frequency hopping method electively via a plurality of different frequency channels K1-Kn. The respective data packet 4 or a defined part of the same is coded before transmission by the transmitter, e.g. the respective consumption metering device 2 and is decoded following reception by the receiver, e.g. the data collector 1. The transmission quality of the frequency channels K1-Kn is evaluated, wherein, on the basis of the evaluation of the transmission quality of the frequency channels K1-Kn, a decision is made in respect of a selection of the frequency channel K1-Kn or frequency channels K1-Kn which is/are used to transmit the data. According to the invention, a likelihood ratio LR for the likelihood of a successful transmission is preferably determined bit-by-bit for the data packet 4 or part of the same before the decoding by the receiver. The likelihood ratio LR can furthermore also be determined for a definable group of bits. The respective likelihood ratios LR of the data packet 4, of a part thereof, of the bits or of a group of bits are then used as a metric for determining the interference state of the data packet 4, wherein the transmission quality of the respective frequency channel K1-Kn is evaluated on the basis of the interference state of the data packet 4 or of a part of the data packet 4.

The likelihood ratio LR is calculated on the basis of the likelihood ratio test. A forward error correction (FEC) which makes it possible to correct the receiver is normally carried out in radio communication systems. As a result, for example, the range of the radio communication system is increased. The likelihood ratios (LRs) which can be recorded e.g. by an LLR module (not shown in the figures) are fed in at the input of the receiver or decoder. If, for example, a data packet 4 made up of bits or a part of the data packet 4 is severely affected by interference, the data packet 4 or the part is down rated, e.g. in the worst case to 50% bit 1/50% bit 0 (i.e. 50% of the bits are affected by interference and 50% of the bits are unaffected by interference). This data packet 4 thus supplies no information or no reliable information. Conversely, a data packet 4 unaffected by interference can accordingly be rated as good at e.g. 99% bit 1/1% bit 0. This likelihood ratio LR can be determined for the data packet 4, a part of the data packet 4, each bit or a group of bits of the data packet 4. A likelihood ratio LR, for example, for a data packet comprising e.g. 12 bits can be determined on the basis of the likelihood ratios LR of the bits in that e.g. 4 bits have an LR=50%/50%, 4 bits an LR=100%/0% and 4 bits an LR=75%/25%. The likelihood ratio LR of the data packet 4 can be correspondingly calculated according to $$LR=(0.33*0.5)+(0.33*1.0)+(0.33*0.85)=0.78(=78\%).$$

A value of 50%, for example, corresponds here to a down rating, i.e. a deficient or interference-affected transmission, and a value of 99%, for example, corresponds to a positive rating, i.e. a very good transmission unaffected by interference. The likelihood ratio LR can furthermore also be used as a numerical measure (metric) for evaluating the transmission quality of the entire frequency channel K1-K6. The data are distributed here in data packets 4 or parts thereof (hops) on a plurality of frequencies or frequency channels K1-K6, wherein a likelihood ratio LR is calculated for each data packet 4 or a part of the data packet. A plurality of data packets 4 which have been transmitted via the same frequency are used to create a frequency metric (frequency evaluation). If no data packets 4 are transmitted on specific frequencies, the quality of these frequencies can alternatively be estimated through interpolation.

Figure 2:
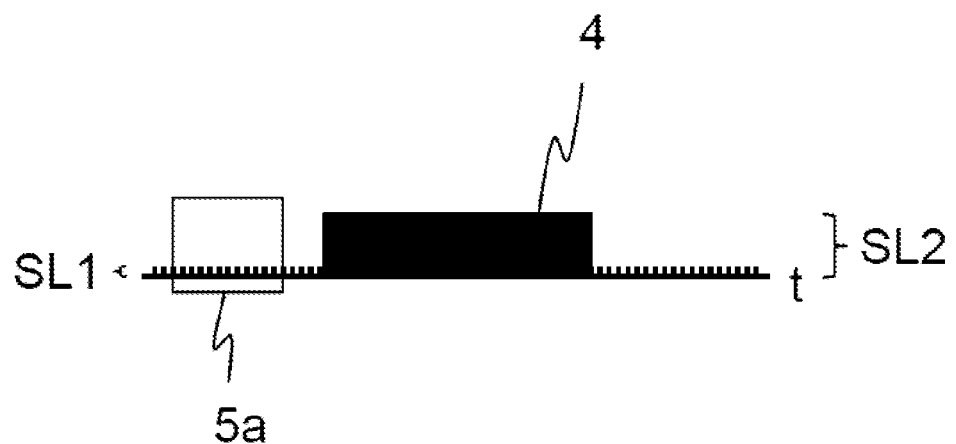
FIG. 2 is a simplified view of a temporal sequence of a transmission of a data packet with low signal noise before and after the data packet.

To select the frequency channels, the signal power SL1, for example, can be determined in a frequency/time block 5a outside the respective data packet 4 in the relevant frequency channel K1-Kn. FIG. 2 shows the temporal sequence of the transmission of a data packet 4 and the signal power SL1 or the signal noise before and after the transmission of the data packet 4. In order to define the signal power SL1, said signal power can be averaged, for example, over the entire frequency/time block 5a or can be defined via the maximum and minimum signal power within the frequency/time block 5a. The signal power SL1 outside the transmission of the data packet 4 is substantially lower here than the signal power SL2 during the transmission of the data packet 4.

Figure 3:
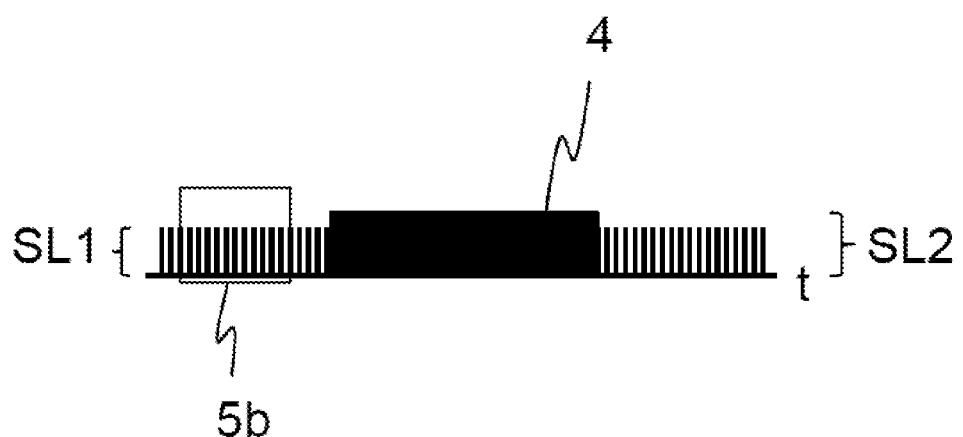
FIG. 3 is a simplified view of the temporal sequence of the transmission of a data packet with significant signal noise before and after the data packet.

FIG. 3 similarly shows a temporal sequence of the transmission of a data packet 4. However, the signal power SL1 outside the transmission of the data packet 4 or within the frequency/time block 5b shows a significant deviation which no longer differs substantially from the signal power SL2 during the transmission of the data packet 4. The signal power SL1 or the signal noise in the frequency/time block 5b is thus substantially higher than the signal power SL1 within the frequency/time block 5a in FIG. 2.

Figure 4:
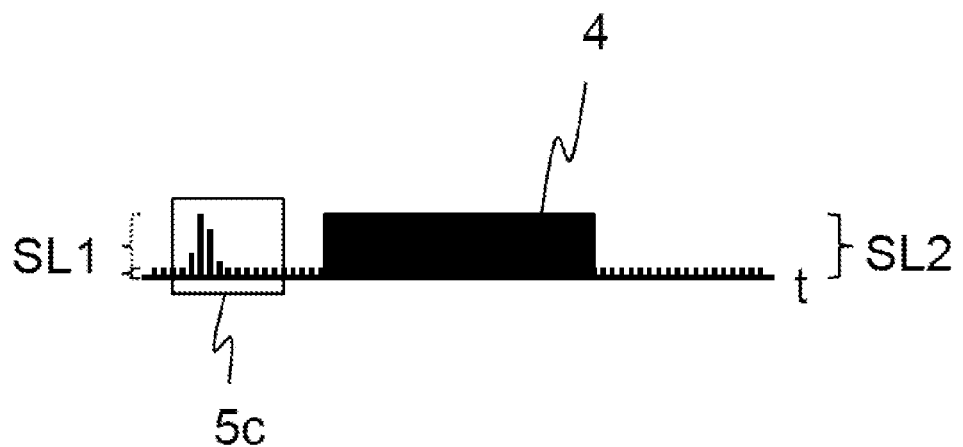
FIG. 4 is a simplified view of the temporal sequence of the transmission of a data packet with an interference signal in the signal noise before the data packet.

The signal power SL1 in the frequency/time block 5a indicates that very little or no interference has occurred or only a few or no external transmissions have taken place on the corresponding frequency channel K1-Kn at this time t. Consequently, the frequency channel K1-Kn appears to be affected by little or no interference. In contrast, the frequency/time block 5b shows a significantly greater signal power SL1, thereby indicating a high proportion of interference and/or a low transmission quality. Similarly, according to FIG. 4, time-limited and/or occasionally occurring interference can be identified by measuring it in a frequency/time block 5c outside the transmission of the respective data packet 4.

Findings of this type can appropriately also be incorporated into the evaluation of the transmission quality of the frequency channels K1-Kn. A limit value, for example, for the signal power SL1 can also be defined in a frequency/time block 5a, 5b, 5c outside the respective data packet 4 of the relevant frequency channel K1-Kn. The currently determined signal power SL1 within a frequency/time block 5a, 5b, 5c outside the respective data packet 4 is constantly compared with this predefined limit value. If the limit value is exceeded, the respective data packet 4 and/or the respective frequency channel K1-Kn is evaluated as affected by interference. Not only uniformly increased signal powers SL1 outside the transmission of the data packet 4 (e.g. an increased signal noise according to the signal power SL1 in FIG. 3), but also occasionally occurring interference signals (e.g. interference according to the signal power SL1 in FIG. 4) are taken into account here in order to detect different types of interference in a targeted manner.

Alternatively or additionally, the signal power SL2 during the transmission of the data packets 4 and the signal power SL1 outside the transmission of the data packets 4 can also be placed in relation to one another, i.e. a signal-to-noise and/or signal-to-interference ratio is/are determined. The respectively determined ratio can provide indications, inter alia, of the transmission quality of the data packets 4 on the respective frequency channel K1-Kn. The decisive factor here is not necessarily how great or small the signal noise SL1 outside the transmission of the data packets 4 is, but rather how much greater the signal power SL2 during the transmission of the data packets 4 is compared with the signal power SL1 outside the transmission of the data packets 4. Different influences on the transmission quality, such as e.g. fading caused by poor transmission conditions at the site (e.g. caused by shadowing) can thereby also be determined and distinguished. The frequency channels K1-Kn are thereby evaluated even more reliably by scaling the interference state of the data packets 4 or the likelihood ratio LR with the signal-to-noise and/or signal-to-interference ratios of the respective data packets 4, i.e. the signal-to-noise ratio or the signal-to-interference ratio is taken into account in the likelihood ratio calculation.

Figure 5:
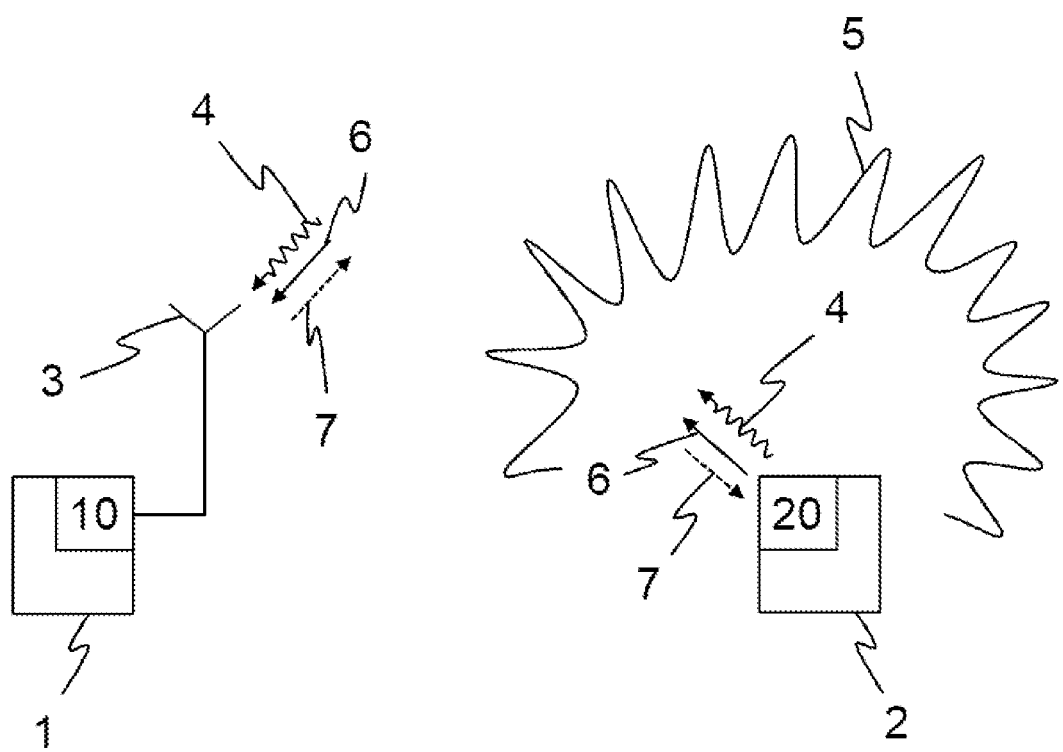
FIG. 5 is a simplified schematic view of a consumption metering device which transmits data packets to a data collector by means of a communication module using the method according to the invention.

FIG. 5 shows the communication system from FIG. 1 with a consumption metering device 2 and interference 5 in the vicinity of the consumption metering device 2. If interference 5 occurs in the vicinity of a frequency channel K1-Kn which is used for the transmission of the data packet 4 from the communication module 20 of the consumption metering device 2 to the communication module 10 of the data collector 1, the consumption metering device 2 or its communication module 20 can establish e.g. on the basis of an interference detection that interference 5 is present. An interference detection based on the likelihood ratio LR, for example, can also be used. In order to then effect a frequency channel changeover, it is advantageous according to one appropriate design if the consumption metering device 2 transmits a change signal 6 which is generated by the communication module 20 via the communication channel 20 to the communication module 10 of the data collector 1. After the communication module 10 has received the change signal 6 from the communication module 20, the communication module 10 verifies the change request for the frequency channel K1-Kn from the communication module 20. In order to effect the change of the frequency channel K1-Kn, the communication module 10 of the data collector 1 generates an acknowledgement signal 7 which the communication module 10 transmits to the communication module 20. The frequency channel K1-Kn or the entire frequency channel pattern 8, 8a-8d can then be changed by the communication module 20 or 10. The change of the frequency channel patterns 8, 8a-8d can thereby be controlled in such a way that a new frequency channel pattern 8, 8a-8d is selected only if it has been verified in terms of transmission quality. The transmission quality can be verified e.g. by means of a frequency channel sampling or by means of the calibration function.

Figure 6:
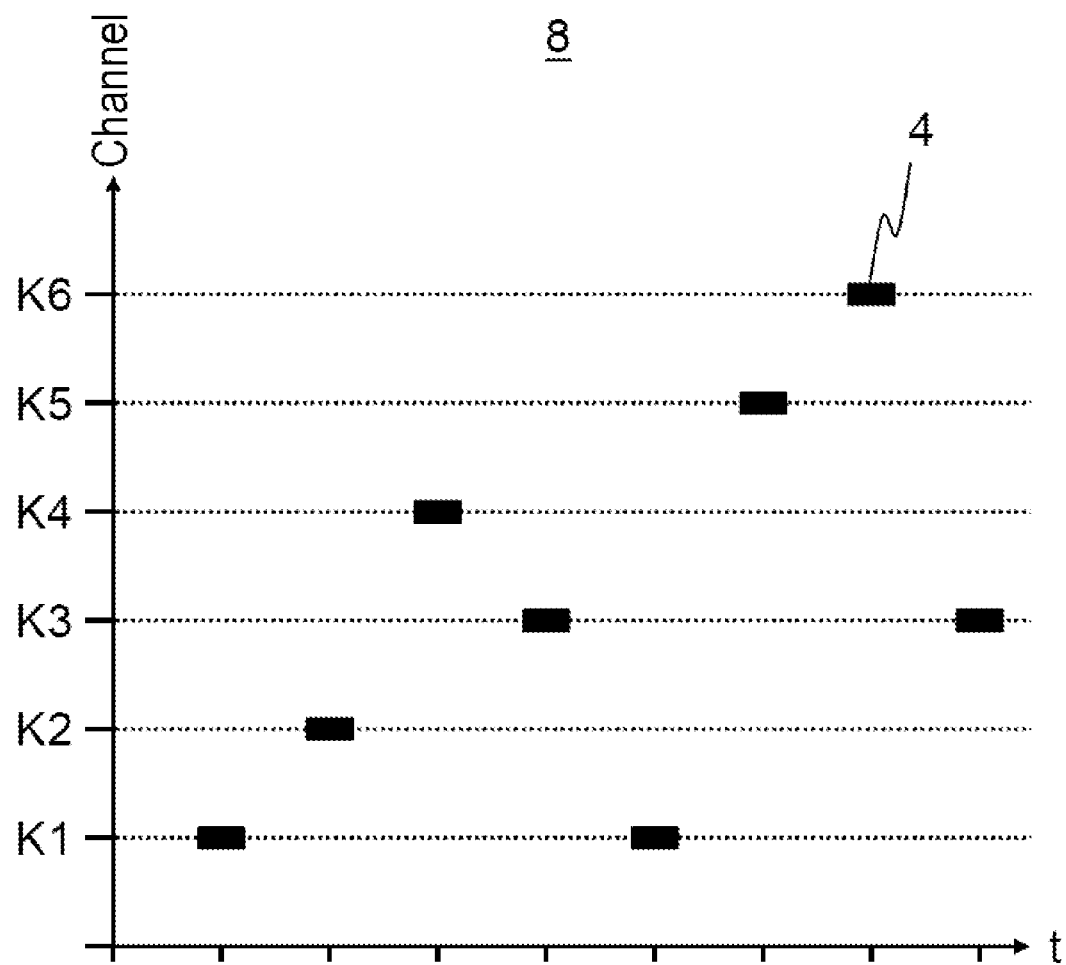
FIG. 6 is an illustration showing an example of a frequency channel pattern using the frequency hopping method.

FIG. 6 shows a simplified view of a frequency channel pattern 8 using the frequency hopping method. The data packets 4 are transmitted here with a time delay via the frequency channels K1-K6 between the communication modules 10, 20. All frequency channels K1-K6 within the frequency channel pattern 8 are used for the transmission of the data packets 4 (full diversity). If interference 5 occurs in the frequency channels K3 and K4, according to FIG. 7, the data packets 4 which are transmitted via the frequency channels K3 and K4 can no longer be transmitted without interference. A loss or partial loss of these data packets 4 would be the consequence. In the method according to the present invention, this interference can be detected in a timely manner e.g. by means of an interference detection already described. Due to a change of the frequency channels K1-K6 to be transmitted or of the entire frequency channel pattern 8, it is guaranteed that even the data packets 4 affected by interference or their interference-affected parts can similarly be transmitted without interference if they are transmitted via the other frequency channels K1, K2, K5 and K6.

Figure 7:
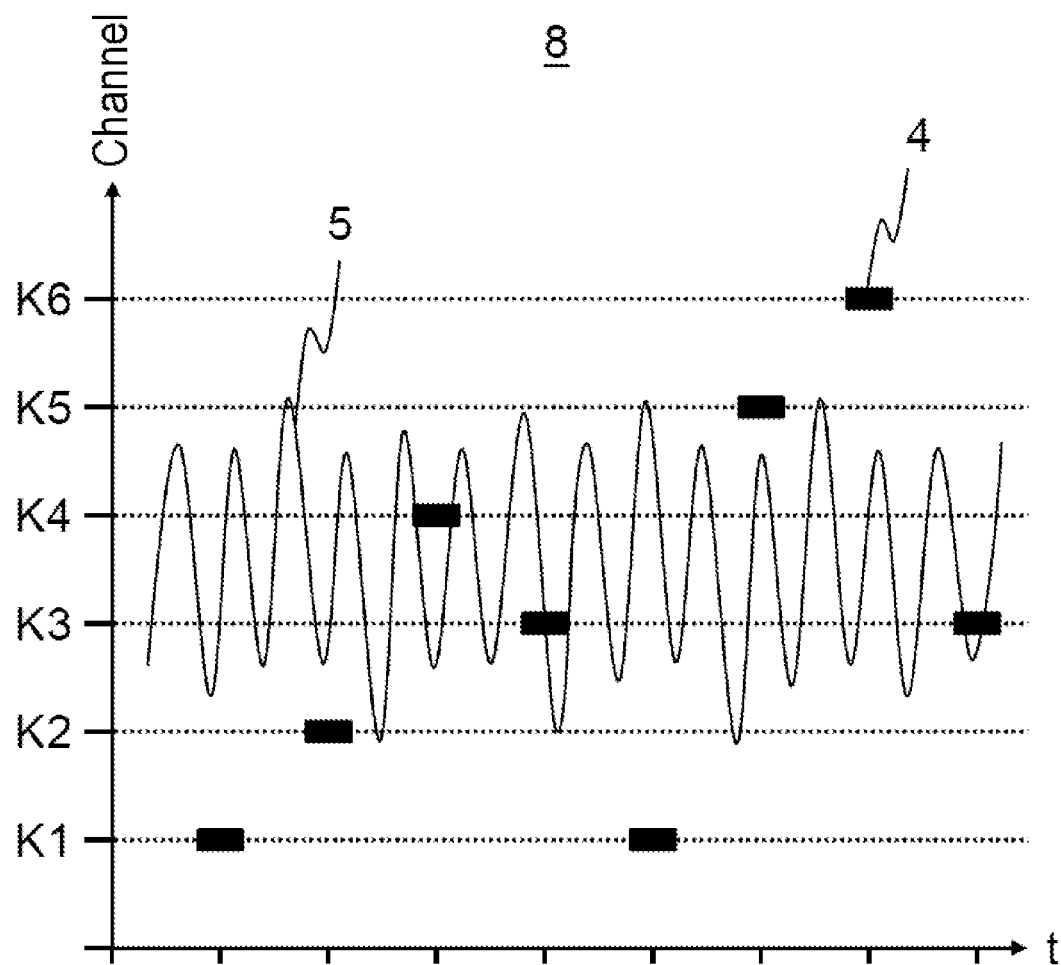
FIG. 7 is an illustration showing a frequency channel pattern from FIG. 6 using the frequency hopping method with frequency channels affected by interference.
Figure 8:
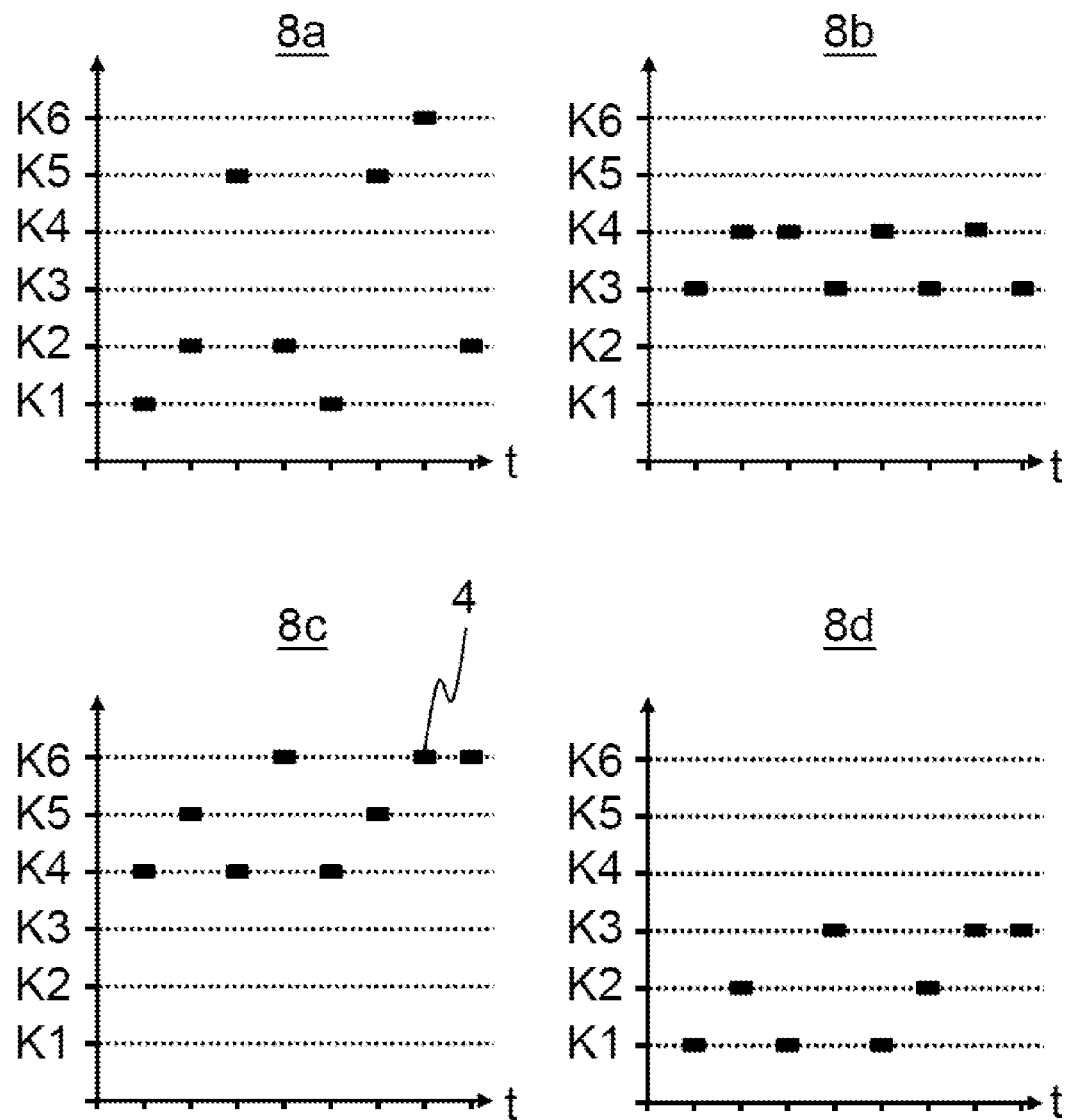
FIG. 8 are illustrations of a plurality of possible frequency channel patterns using the frequency hopping method.

The frequency channel pattern 8 according to FIG. 6 and FIG. 7 can be changed to the frequency channel pattern shown in FIG. 8. The frequency channel pattern 8a shows a peripheral weighting of the frequency channels K1-K6. The frequency channels K3 and K4 are eliminated here. The frequency channel pattern 8a can be used accordingly if the middle frequency ranges K3 and K4 are affected by interference. Alternatively, in the case of peripheral interference affecting e.g. the frequency channels K1, K2, K5, K6, the frequency channel pattern 8b can be used, in which a center-weighted measurement of the frequency ranges or the frequency band is performed via the frequencies K3 and K4. In the case of unilateral peripheral interference, i.e. interference in either the upper or lower frequency range, the respective interference-affected frequency range is eliminated. According to the frequency channel pattern 8c, the lower frequency range within which the frequency channels K1-K3 lie, is correspondingly eliminated. The data packets 4 are transmitted here only via the frequency channels K4-K6 of the upper frequency range. The frequency channel pattern 8d also shows a transmission of the data packets 4 in the lower frequency range via the frequency channels K1-K3, wherein the frequency channels K4-K6 which lie within the upper frequency range are eliminated for the transmission of the data packets 4.

Figure 9:
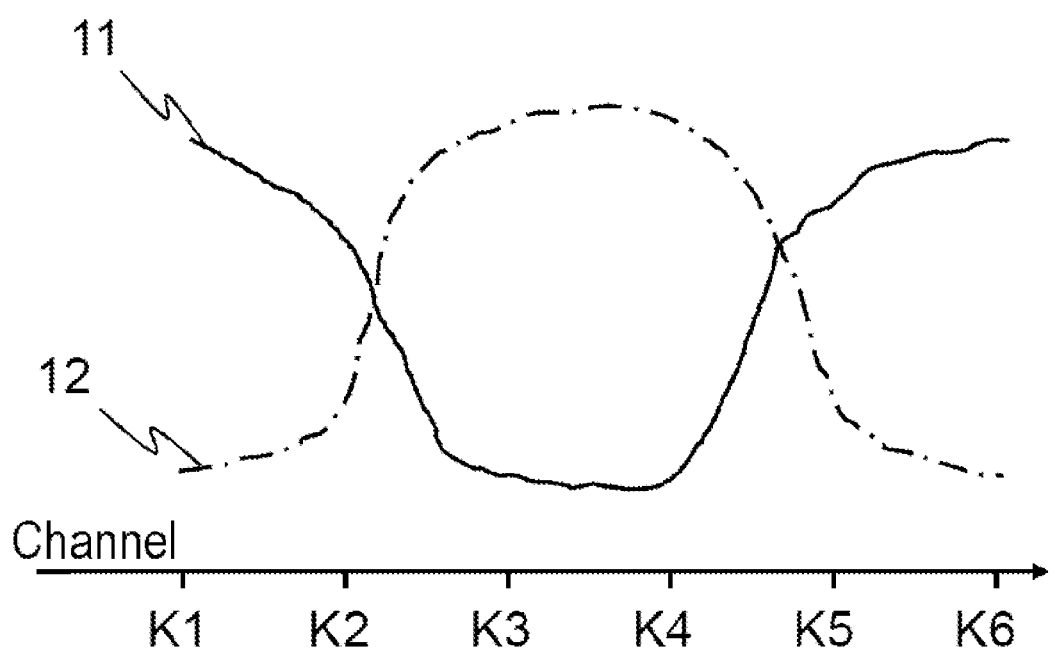
FIG. 9 is a simplified view of the data packet error rate curve and the likelihood ratio curve over the frequency channels of the interference-affected frequency channel pattern from FIG. 7.

The likelihood ratios LR of the frequency channels K1-K6 can preferably be plotted as the likelihood ratio curve 11 over the frequency channels K1-K6. The likelihood ratio curve 11 of the likelihood ratios LR for the frequency channels K1-K6 of the interference-affected frequency channel pattern 8 according to FIG. 7 is represented graphically in FIG. 9. According to FIG. 9, the likelihood ratio LR is highest for channels K1 and K6 and lowest for channels K3 and K4. The frequency channels K3 and K4 are consequently to be evaluated as affected by interference.

A data packet error rate (hop error rate) can furthermore be defined for each frequency channel K1-Kn, e.g. on the basis of the interference detection and the signal-to-noise ratio on the respective frequency channel K1-Kn. The data packet error rate curve 12 for the frequency channels K1-K6 according to the interference-affected frequency channel pattern 8 in FIG. 7 is similarly shown in FIG. 9. It is similarly evident here that the frequency channels K3 and K4 which have a high data packet error rate are unsuitable for a transmission of the data packets 4. The frequency channels K1 and K6 which have a low data packet error rate are furthermore highly suitable for the transmission of the data packets 4. It is evident here also that a frequency channel changeover should take place in such a way that the peripheral frequency channels K1, K2, K5 and K6 which are suitable for a data transmission of the data packets 4 are used for the transmission of the data packets 4. This evaluation of the frequency channels K1-K6 is defined here by the data packet error rate and the likelihood ratio LR. The reliability of the selection of the frequency channels K1-K6 is increased to a considerable extent by this double evaluation.

The likelihood ratio LR of the data packet 4 can be represented either by the indication of whether the data packet 4 is or is not affected by interference, or precisely as a numerical value or percentage expression. If the likelihood ratio LR is indicated as a dual expression, e.g. "0" and "1", the frequency channel K1-K6 is to be categorized as in good order as soon as the sum of the likelihood ratios is LR>0 (e.g. two thirds of the bits are in good order).

A selection for a frequency channel pattern ("Hop metric") can be made on the basis of the percentage representation through an averaging of the interference states of the data packets 4 or their parts or the likelihood ratios LR. A quality indicator QI is preferably defined or calculated for the evaluation of the respective frequency channel pattern 8, 8a-8d. The calculation is performed e.g. via the average weighting of the data packets 4 or their interference states. For example, 25% of the data packets 4 can be weighted at 50% (completely affected by interference), 25% at 60% (slight tendency) and 50% at 98% (virtually unaffected by interference). The quality indicator QI for the frequency channel is calculated here according to $$QI=(0.25*0.5)+(0.25*0.6)+(0.5*0.98)=0.765\ (=76.5\%).$$

A limit value LV of the quality indicator QI can furthermore be defined for the decision as to whether a frequency channel pattern 8, 8a-8d is or is not used, e.g. 70%, preferably 75%, particularly preferably 80%. The currently calculated quality indicators QI of the respective frequency channel patterns 8, 8a-8d can then be compared with the limit value of the quality indicator QI, wherein the current frequency channel pattern 8, 8a-8d is changed to a different frequency channel pattern 8, 8a-8d which has the highest possible quality indicator QI if the limit value of the quality indicator QI is understepped.

In the case where specific frequencies or frequency channels K1-K6 are affected by interference, a new frequency channel pattern 8, 8a-8d can thus be selected. If the receiver wishes to change the frequency channel pattern 8, 8a-8d, the receiver can either itself decide which frequency channel pattern 8, 8a-8d is set, inform the transmitter which frequency channel pattern 8, 8a-8d is intended to be set or leave the decision to the transmitter. An "agreement" is preferably made here between the transmitter and the receiver ("ping-pong").

Alternatively or additionally, the number of received data packets 4 that are unaffected by interference can also be used for the evaluation of the frequency channel pattern 8, 8a-8d. To do this, the number of interference-unaffected data packets 4 which is required in order to successfully decode the entire data message is compared with the number of received interference-unaffected data packets 4. If the number of received interference-unaffected data packets 4 is less than the number of required data packets 4, the frequency channel K1-Kn or the frequency channel pattern 8, 8a-8d is evaluated as affected by interference. This can be done automatically, for example, by means of a forward error correction (FEC) which serves to reduce the error rate in the transmission of the data packets 4. The data packets 4 to be transmitted by the transmitting communication module 10 or 20 are coded in a redundant manner in a transmission system so that the receiving communication module 10 or 20 can detect and correct transmission errors without an inquiry to the transmitting communication module 10 or 20.

Figure 10:
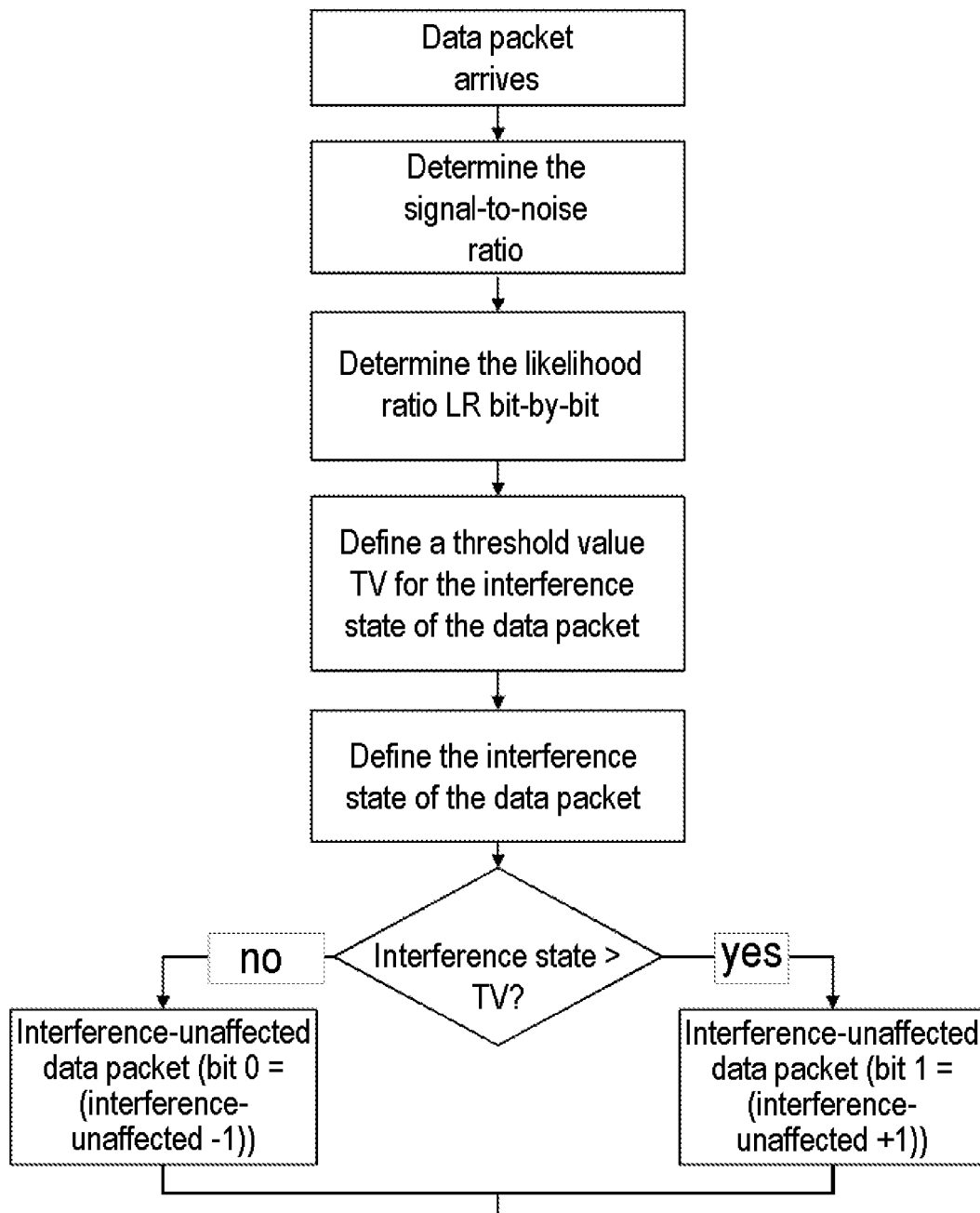
FIG. 10 is a first flow diagram for verifying the transmission quality of a frequency channel.

FIG. 10 shows one design of a flow diagram for verifying the transmission quality of a frequency channel K1-Kn. The signal-to-noise ratio or the signal-to-interference ratio is preferably first determined for the data packet 4 arriving at the receiver. The likelihood ratio LR is furthermore preferably determined bit-by-bit in order to identify the interference state of the data packet 4. A threshold value TV (e.g. 75%) is then defined for the interference state. The signal-to-noise ratio or signal-to-interference ratio can furthermore be used to determine the likelihood ratio LR, i.e. the likelihood ratio LR is defined and scaled with the signal-to-noise ratio or signal-to-interference ratio. A quality indicator QI can then be determined for the respective frequency channel pattern 8, 8a-8d as described above on the basis of the likelihood ratios LR of the bits or of the data packets 4. The frequency channel pattern 8, 8a-8d is then evaluated as unaffected by interference if the quality indicator QI is greater than the limit value LV.

The flow diagram according to FIG. 10 can be performed continuously for each data packet 4 or parts of the same, on a random basis for specific data packets 4 or as part of the frequency channel sampling or the calibration function. The transmission quality of a frequency channel pattern 8, 8a-8d can be determined here by transmitting and verifying all of the data packets 4 of a frequency channel pattern 8, 8a-8d (e.g. eight data packets 4 according to FIGS. 6-8) at least once on the corresponding frequency channels K1-K6. Some of the data packets 4 or hops, for example, remain on their frequency channel while other data packets 4 are transmitted on alternative frequencies or other frequency channels in order to test these frequencies or frequency channels. The entire frequency band can thereby be sampled, as a result of which gaps in the spectrum can be identified and can then be closed e.g. through interpolation.

Figure 11:
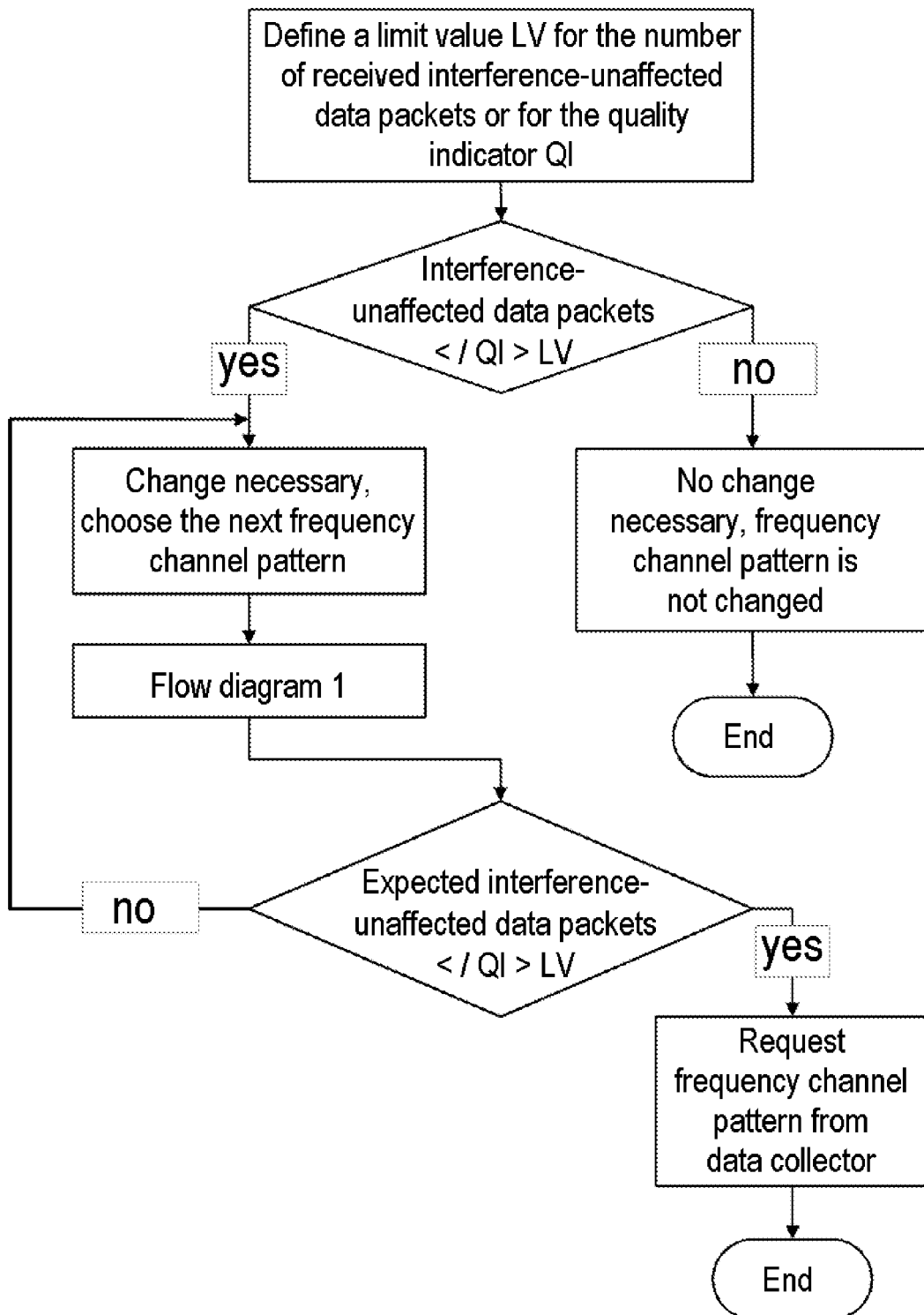
FIG. 11 is a second flow diagram for changing the frequency channel pattern.

FIG. 11 shows one design of a flow diagram for changing the frequency channel pattern 8, 8a-8d. The first step of the flow diagram entails determining or defining a limit value LV for the number of transmitted interference-unaffected data packets 4 which is required in order to be able to successfully decode the data packets 4, or for the quality indicator QI, e.g. 10%. If the number of actually received data packets 4 or the quality indicator QI is above the limit value LV, no change of the frequency channel pattern 8, 8a-8d is required. If the number of actually received data packets 4 or the quality indicator QI is below the limit value LV, a change of the frequency channel pattern 8, 8a-8d is required. For this purpose, a verification of the transmission quality of the data packets 4 on the corresponding frequency channels K1-Kn of the frequency channel pattern 8, 8a-8d to be set is first carried out according to the flow diagram in FIG. 10. The frequency channel pattern 8, 8a-8d is consequently verified before a change to this frequency channel pattern 8, 8a-8d takes place. If the number of expected interference-unaffected data packets 4 determined here is above the limit value LV (e.g. 99%/bit 1 and 1%/bit 0), the respective frequency channel pattern 8, 8a-8d can be selected, for example, by the transmitter and/or receiver. If the determined number of expected interference-unaffected data packets 4 is below the limit value LV (e.g. 50%/bit 1 and 50%/bit 0), a new frequency channel pattern 8, 8a-8d is verified by means of the flow diagram according to FIG. 10 and is selected once more in the event of corresponding transmission quality. The flow diagram according to FIG. 11 is preferably repeated until a frequency channel pattern 8, 8a-8d which has at least a sufficiently good transmission quality has been determined.

Figure 12:
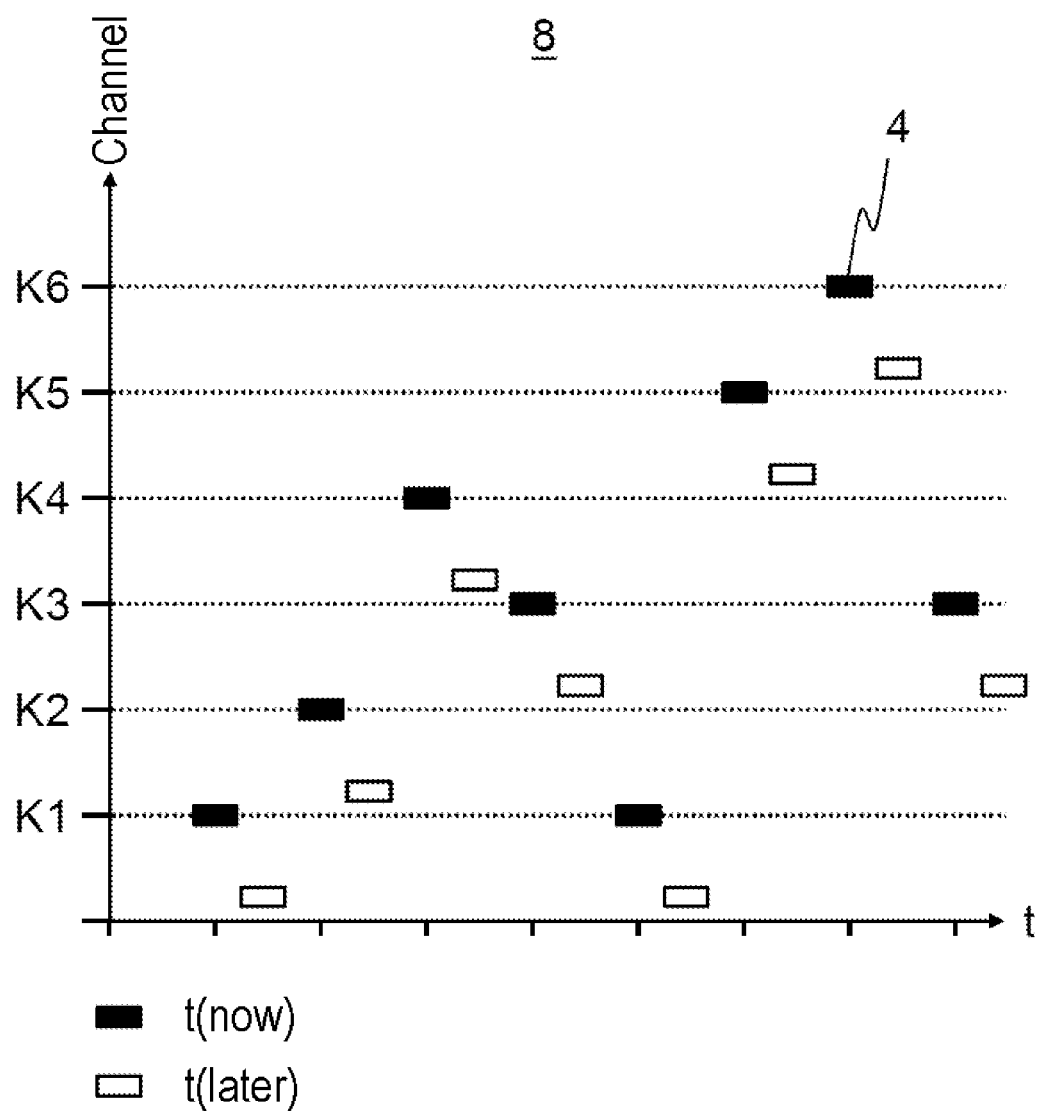
FIG. 12 is a graph of a transmission sequence of a data transmission from a transmitter to a receiver in a specific frequency channel pattern with frequency deviation on the transmitter side and the receiver side.

FIG. 12 shows a data transmission in which the transmitter and the receiver have first agreed at time t(now) on the frequency channel pattern indicated in FIG. 12 with black data packets 4, wherein the data packets 4 (or only parts thereof) are transmitted via the frequency channels K1-K6 in the temporal sequence shown. However, due to deviations in the frequency reference devices of the transmitter and receiver, e.g. the consumption metering device 2 and the data collector 1, the set frequency channel pattern or the set frequency channels may differ after a certain time period at time t(later) on the transmitter side and on the receiver side, as shown in FIG. 12 on the basis of the white data packets. The transmit frequency may, for example, shift by 5 kHz or the like, so that the data transmission would no longer be successful.

In order to avoid this problem, the data collector 1 can, for example, also take account of the error of the frequency reference device of the consumption metering device 2 in the selection of the frequency channel K1-Kn or the frequency channel pattern 8, 8a-8d. The data collector 1 can, for example, estimate the error of the frequency reference device of the consumption metering device 2 (e.g. a crystal error of 5 ppm, 5 kHz or the like) and can already incorporate it into the frequency channel.

Individual feature combinations (sub-combinations) and also possible combinations of individual features of different design forms not shown in the figures in the drawing are also expressly comprised by the content of the disclosure.

The following is a summary list of reference numerals and the corresponding structure used in the above description of the invention:

1 Data collector
2 Consumption metering device
3 Antenna
4 Data packet
5 Interference
5a Frequency/time block
5b Frequency/time block
5c Frequency/time block
6 Change signal
7 Acknowledgement signal
8 Frequency channel pattern (full diversity)
8b Frequency channel pattern (center-weighted)
8a Frequency channel pattern (periphery-weighted)
8c Frequency channel pattern (in the high frequency range)
8d Frequency channel pattern (in the low frequency range)
10 Communication module
11 Likelihood ratio curve
12 Data packet error rate curve
20 Communication module
K1-Kn Frequency channels
LR Likelihood ratio
QI Quality indicator
SL1 Signal power outside the transmission of the data packets
SL2 Signal power during the transmission of the data packets
t Time
LV Limit value
TV Threshold value
DR Data packet reliability

The invention claimed is:

1. A method for selecting frequency channels in a communication system using a frequency hopping method, in which data are transmitted between a transmitter and a receiver by means of radio transmission, which comprises the steps of:
   transmitting the data in parts of data packets in a frequency/time block;
   providing a plurality of different frequency channel patterns, each frequency channel pattern having a defined sequence of occupancy of the frequency channels;
   transmitting the parts of the data packets electively via the plurality of different frequency channel patterns, wherein a respective data packet or parts of the respective data packet are coded before transmission by the transmitter and are decoded after reception by the receiver;
   evaluating a transmission quality of the frequency channels and, on a basis of an evaluation of the transmission quality of the frequency channels, a decision is made in respect of a selection of at least one frequency channel pattern which is used to transmit the data,
   receiving the data packet by the receiver;
   determining a likelihood ratio LR of a part of a data packet by the receiver;
   determining an interference state of the part of the data packet on a basis of the likelihood ratio LR of the part of the data packet;
   evaluating the transmission quality of a respective frequency channel on a basis of the interference state of the part of the data packet;
   selecting and/or correcting the respective frequency channel pattern on the basis of an evaluation result; and
   communicating a selected and/or corrected frequency channel or frequency channel pattern from the receiver to the transmitter.

2. The method according to claim 1, which further comprises:
   providing a memory to store evaluations of the transmission quality of the frequency channel; and
   selecting the frequency channels and/or the frequency channel pattern on a basis of stored evaluations.

3. The method according to claim 1, which further comprises determining a quality indicator QI used to evaluate a respective frequency channel pattern on a basis of the evaluation of the transmission quality of the frequency channels and/or the interference state of the data packets.

4. The method according to claim 1, wherein at least one of the transmitter or the receiver is a consumption metering device to record consumption data or a data collector to collect the consumption data.

5. The method according to claim 1, wherein the transmitter is an apparatus for determining content level.

6. A method for selecting frequency channels in a communication system using a frequency hopping method, in which data are transmitted between a transmitter and a receiver by means of radio transmission, which comprises the steps of:
   transmitting the data in parts of data packets in a frequency/time block;
   providing a plurality of different frequency channel patterns, each frequency channel pattern having a defined sequence of occupancy of the frequency channels;
   transmitting the parts of the data packets electively via a plurality of different frequency channels, wherein a respective data packet or the parts of the respective data packet are coded before transmission by the transmitter and are decoded after reception by the receiver;
   evaluating a transmission quality of the frequency channels and, on a basis of an evaluation of the transmission quality of the frequency channels, a decision is made in respect of a selection of at least one frequency channel pattern which is used to transmit the data;

receiving the parts of the data packets by the receiver;

determining a likelihood ratio LR of a part of a data packet by the receiver;

estimating by the receiver a frequency deviation of a frequency reference device of the transmitter;

determining the interference state of the part of the data packet on a basis of the likelihood ratio LR of said part of a data packet;

evaluating the transmission quality of a respective frequency channel on a basis of the interference state of the part of the data packet;

selecting and/or correcting the respective frequency channel pattern on the basis of said evaluation result and frequency deviation; and communicating a selected and/or corrected frequency channel pattern from the receiver to the transmitter.

7. The method according to claim 6, which further comprises:

providing a memory to store evaluations of the transmission quality of the frequency channel; and selecting the frequency channels and/or the frequency channel pattern on a basis of stored evaluations.

8. The method according to claim 6, which further comprises determining a quality indicator QI used to evaluate a respective frequency channel pattern on a basis of the evaluation of the transmission quality of the frequency channels and/or the interference state of the data packets.

9. The method according to claim 6, wherein at least one of the transmitter or the receiver is a consumption metering device to record consumption data or a data collector to collect the consumption data.

10. The method according to claim 6, wherein the transmitter is an apparatus for determining content level.

\* \* \* \* \*